US007431645B2

(12) United States Patent
Han et al.

(10) Patent No.: US 7,431,645 B2
(45) Date of Patent: Oct. 7, 2008

(54) WAGERING GAME WITH AWARD BASED ON SEQUENCING OF CONNECTED FEATURES

(75) Inventors: Peng Han, Aurora, IL (US); Jeremy M. Hornik, Chicago, IL (US); Robert L. Kyte, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 380 days.

(21) Appl. No.: 11/111,315

(22) Filed: Apr. 21, 2005

(65) Prior Publication Data

US 2006/0252500 A1 Nov. 9, 2006

(51) Int. Cl.
*A63F 13/00* (2006.01)

(52) U.S. Cl. .......................................... 463/16; 463/20

(58) Field of Classification Search ............. 463/16–20; 273/138.1, 139

See application file for complete search history.

(56) References Cited

U.S. PATENT DOCUMENTS

| | | | | |
|---|---|---|---|---|
| 4,198,052 | A | 4/1980 | Gauselmann | 273/143 R |
| 5,580,053 | A | 12/1996 | Crouch | 463/20 |
| 5,611,535 | A | 3/1997 | Tiberio | 273/143 R |
| 5,807,172 | A | 9/1998 | Piechowiak | 463/20 |
| 5,855,514 | A * | 1/1999 | Kamille | 463/17 |
| 5,931,467 | A * | 8/1999 | Kamille | 273/139 |
| 6,241,607 | B1 | 6/2001 | Payne et al. | 463/20 |
| 6,572,472 | B1 * | 6/2003 | Glavich | 463/16 |
| 6,602,137 | B2 | 8/2003 | Kaminkow et al. | 463/16 |
| 6,676,126 | B1 * | 1/2004 | Walker et al. | 273/139 |
| 6,783,455 | B2 * | 8/2004 | Glavich | 463/16 |
| 6,817,944 | B2 | 11/2004 | Kaminkow et al. | 463/16 |
| 6,910,962 | B2 | 6/2005 | Marks et al. | 463/16 |
| 6,958,013 | B2 * | 10/2005 | Miereau et al. | 463/16 |
| 7,056,214 | B2 | 6/2006 | Miereau et al. | 463/20 |
| 2001/0040341 | A1 * | 11/2001 | Kamille | 273/138.1 |
| 2003/0130025 | A1 * | 7/2003 | Gilmore et al. | 463/16 |
| 2003/0157982 | A1 * | 8/2003 | Gerrard et al. | 463/20 |
| 2004/0033829 | A1 | 2/2004 | Pacey et al. | 463/20 |
| 2004/0043809 | A1 | 3/2004 | Gomez et al. | 463/16 |
| 2005/0064928 | A1 * | 3/2005 | Baerlocher et al. | 463/16 |
| 2005/0101373 | A1 * | 5/2005 | Mierau et al. | 463/20 |
| 2005/0208994 | A1 * | 9/2005 | Berman | 463/20 |

* cited by examiner

*Primary Examiner*—Robert E Pezzuto
*Assistant Examiner*—Damon Pierce
(74) *Attorney, Agent, or Firm*—Nixon Peabody LLP

(57) ABSTRACT

A gaming system for playing a wagering game includes a wager input device, a display, and a controller. The wager input device receives a wager input from a player. The display displays an arrangement of symbols including primary symbols and connector symbols, wherein at least some of the primary symbols are separated from each other and at least two primary symbols are connected with one of the connector symbols. Further, at least some of the primary symbols have corresponding awards. The controller is programmed to cause a sequential display of outcomes, which is initiated with a first primary symbol and which includes other primary symbols that are connected, via one or more of the connector symbols, to the first primary symbol. The player is provided with a payout related to the awards of the primary symbols that are part of the sequential display of outcomes.

24 Claims, 5 Drawing Sheets

WAGERING GAME WITH AWARD BASED ON SEQUENCING OF CONNECTED FEATURES

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having a controller for triggering a sequential display of outcomes for all symbols of an arrangement of symbols that are coupled to a start connector symbol.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

According to one aspect of the present invention, a gaming system for playing a wagering game includes a wager input device, a display, and a controller. The wager input device receives a wager input from a player. The display displays an arrangement of symbols including primary symbols and connector symbols, wherein at least some of the primary symbols are separated from each other and at least two primary symbols are connected with one of the connector symbols. Further, at least some of the primary symbols have corresponding awards. The controller is programmed to cause a sequential display of outcomes, which is initiated with a first primary symbol and which includes other primary symbols that are connected, via one or more of the connector symbols, to the first primary symbol. The player is provided with a payout related to the awards of the primary symbols that are part of the sequential display of outcomes.

According to another aspect of the invention, a method of conducting a wagering game on a gaming machine includes receiving a wager input from a player for playing the wagering game. The method further includes forming an arrangement of symbols including a plurality of primary symbols and a plurality of connector symbols. The primary symbols are located separate from each other, wherein at least two of the primary symbols are randomly connected with one of the connector symbols. Further, at least two of the primary symbols are not connected with one of the connector symbols. A sequential display of outcomes is triggered, involving at least some of the primary symbols that are interconnected via the connector symbols. An awarded payout relates to at least some of the primary symbols involved in the sequential display.

According to yet another aspect of the invention, a method of conducting a wagering game on a gaming terminal includes receiving a wager input from a player and displaying a randomly selected arrangement of connectors and hidden symbols. The method further includes forming at least one continuous path such that at least one of the connectors is connected to at least two of the hidden symbols, wherein the continuous path includes a start element. A sequential chain of outcomes is triggered, wherein the outcomes are associated with all of the hidden symbols that are coupled to the start element along the continuous path. An award is awarded for at least one of the outcomes.

According to yet another aspect of the invention, a computer readable storage medium is encoded with instructions for directing a gaming device to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1:
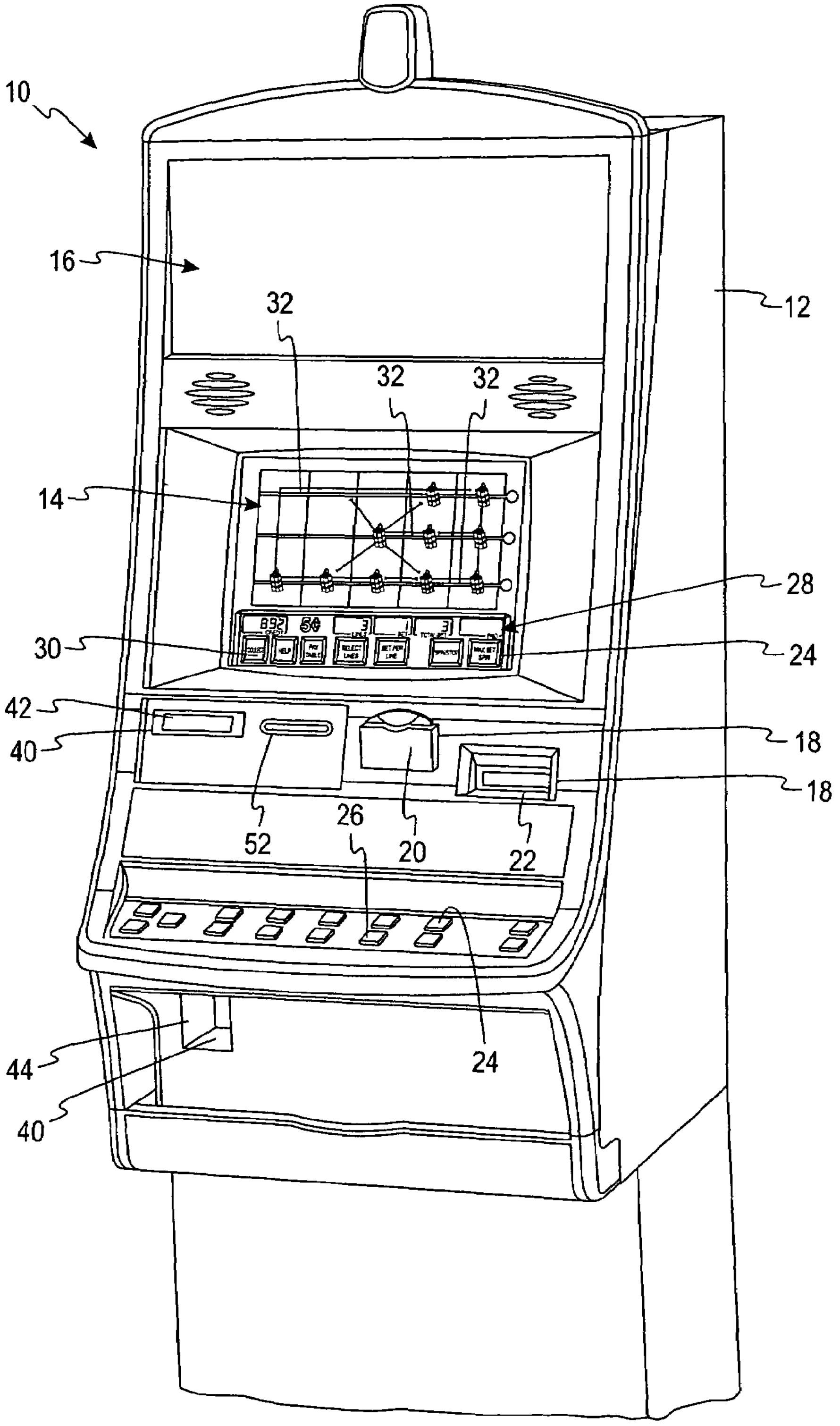
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
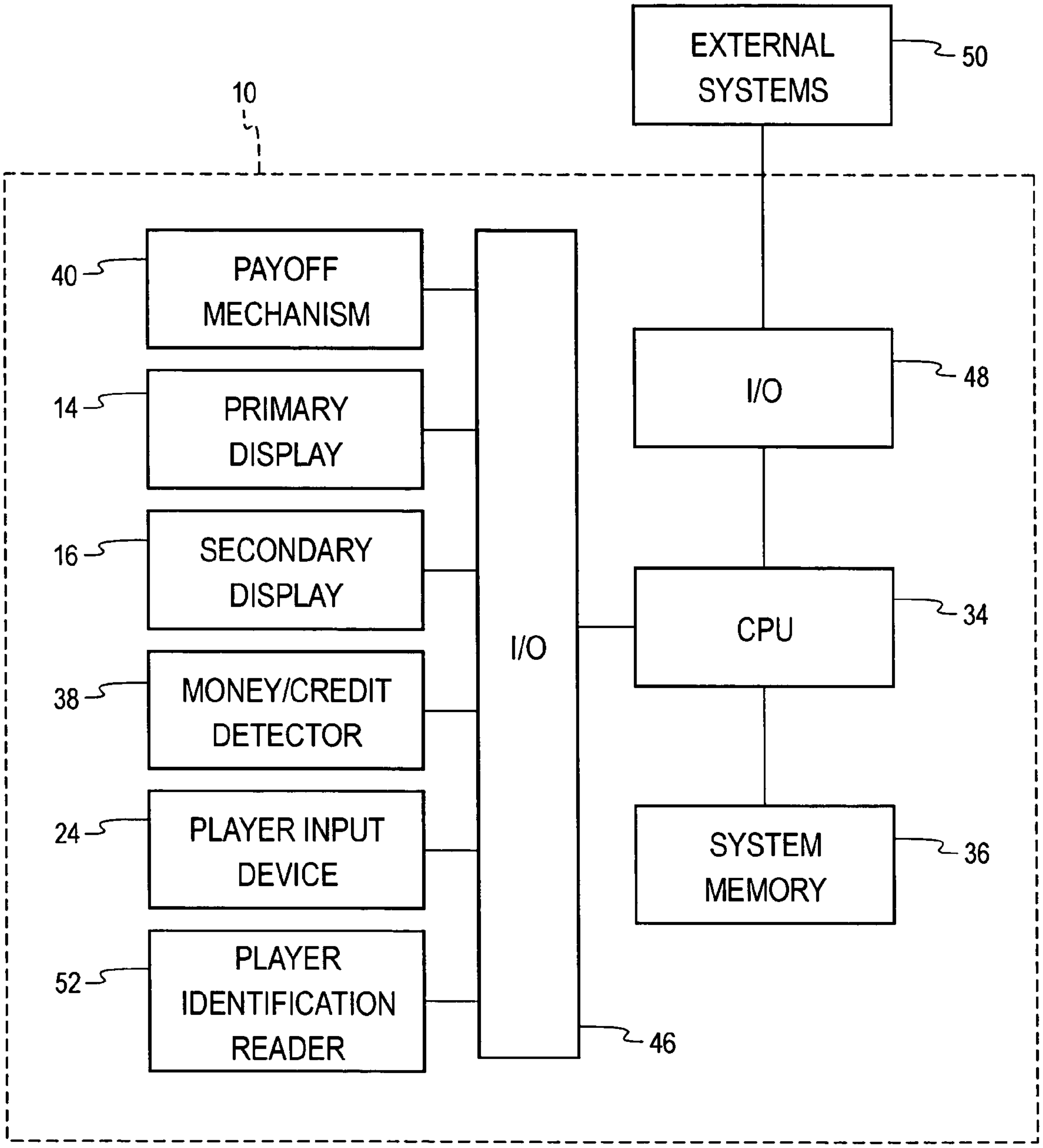
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
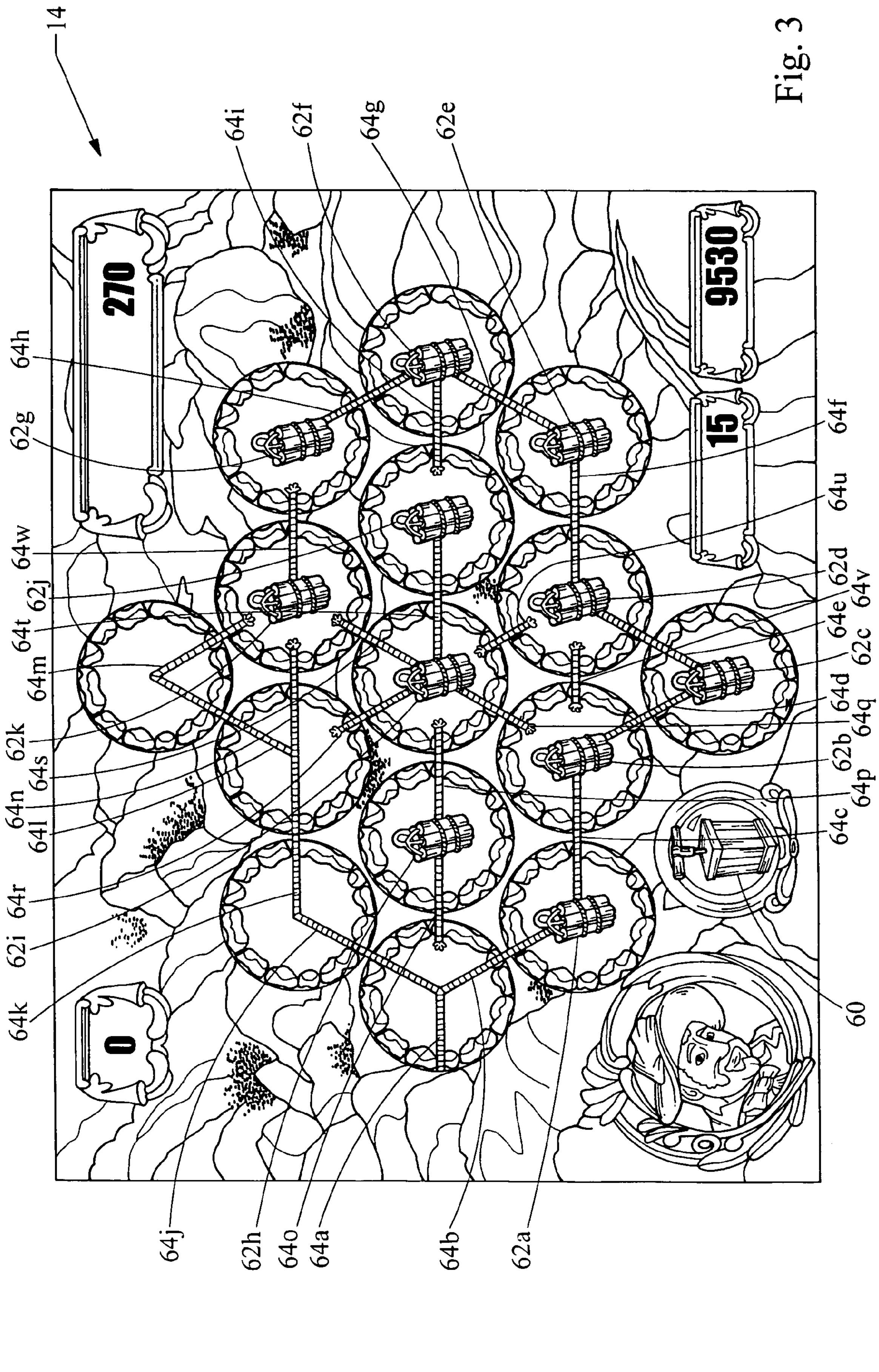
FIG. 3 is an illustration of a game screen having a plurality of dynamite stacks connected via a plurality of fuses, according to one aspect of the present invention.

Turning now to FIG. 3, the display 14 illustrates a game in which a chain of outcomes is triggered for a plurality of connected elements of an arrangement of elements, wherein at least one award is revealed for at least one of the connected elements. The game includes a detonating indicator 60, a plurality of dynamite stacks 62, and a fuse 64. In general, the fuse 64 begins to burn from the left side, and every dynamite stack 62 that is connected, or coupled, to the fuse 64 explodes. The term connected refers to both a direct connection and an indirect connection. After a series of explosions, as described below, an award is provided for one or more of the dynamite stacks 62 that have exploded.

The detonating indicator 60 provides an indication that the fuse 64 has been lit. For example, the detonating indicator 60 is a player-selectable button that, upon being touched by the player, lights the fuse 64 and triggers a chain of explosions for all the dynamite stacks 62 that are connected to the fuse 64. Alternatively, the detonating indicator 60 indicates that a countdown has been triggered by the controller 34 for lighting the fuse 64. As the time of the countdown expires, the detonating indicator 60 flashes faster and faster until the fuse 64 has been lit.

The fuse 64 has a plurality of fuse segments, which includes a start segment 64*a*. After the start segment 64*a* has been lit, a sequential chain of events is triggered such that all the fuse segments that are coupled to the start segment 64*a* burn. For example, all of the fuse segments 64*a*-64*n* will eventually burn after the start segment 64*a* has been lit. However, all the disconnected fuse segments 64*o*-64*w* will remain unburned because there is no connection to the start segment 64*a*.

Some segments of the fuse segments 64*a*-64*n* are connected to each other via other fuse segments 64*a*-64*n*, e.g., the fuse segment 64*k* is connected to the start segment 64*a* via the fuse segment 64*j*. Other segments of the fuse segments 64*a*-64*n* are connected to each other via one or more of the fuse segments 64*a*-64*n* and the dynamite stacks 62*a*-62*g*, e.g., the fuse segment 64*c* is connected to the start segment 64*a* via the fuse segment 64*b* and the dynamite stack 62*a*.

The dynamite stacks 62*a*-62*g*, which are connected to the start segment 64*a*, will eventually explode to provide an award for the player. The dynamite stacks 62*h*-62*k*, which are not connected to the start segment 64*a*, will not explode to provide an award.

Figure 4:
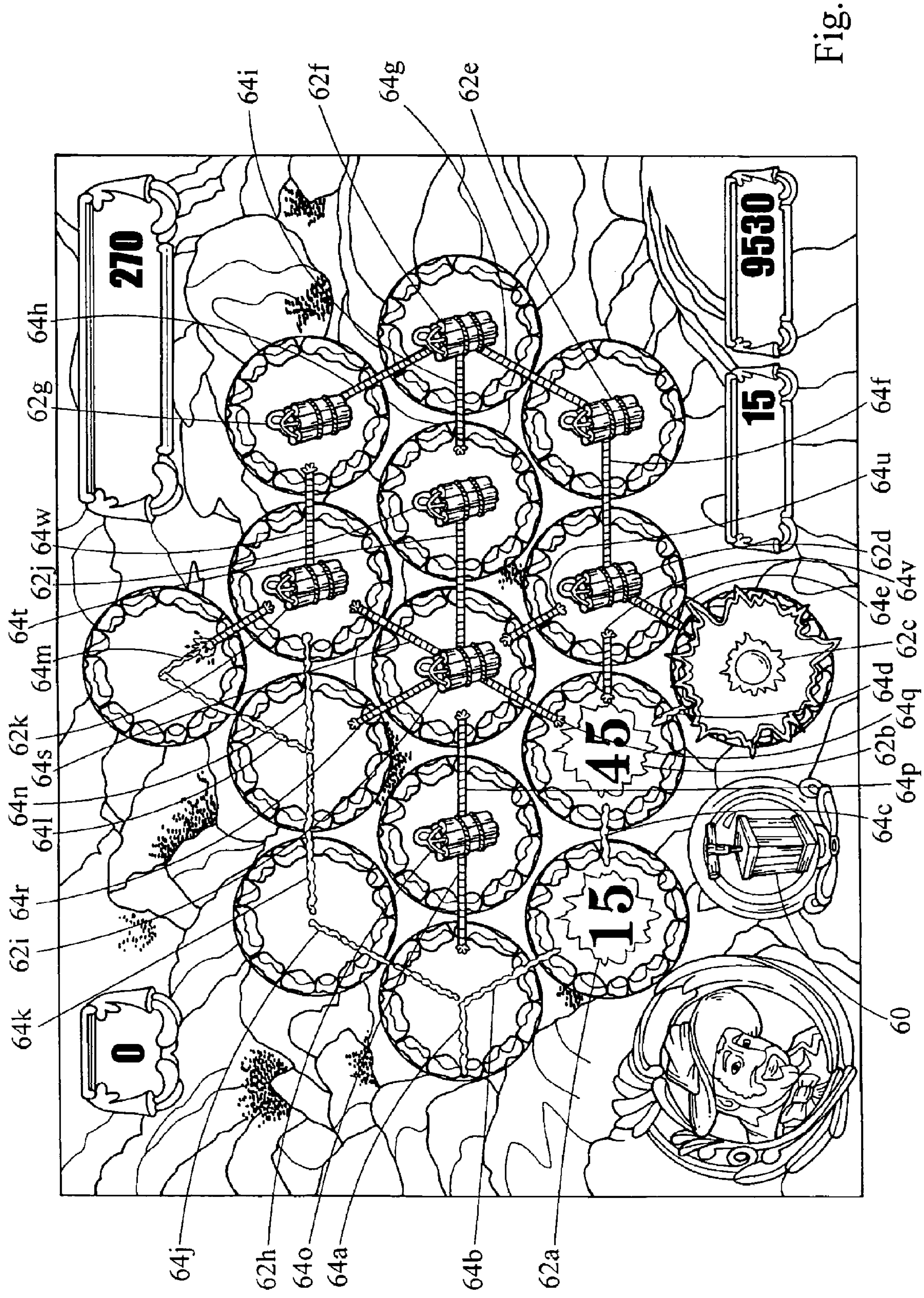
FIG. 4 is an illustration of the game screen of FIG. 3, showing an exploded state of some of the dynamite stacks.

Referring to FIG. 4, the start segment 64*a* has been lit and a plurality of fuse segments that are connected to the start segment 64*a* have already burned out. As shown, the lower segment 64*b*, which is directly connected to the start segment 64*a*, has burned to trigger an explosion of the connected dynamite stack 62*a*. The explosion of the dynamite stack 62*a* reveals an award of fifteen credits to the player and, further, ignites another connecting fuse segment 64*c*. When the fuse segment 64*c* has burned out, the connected dynamite stack 62*b* explodes to reveal an award of forty-five credits.

The explosion of the dynamite stack 62*b* ignites only one other fuse segment 64*d*, which in turn causes the explosion of another dynamite stack 62*c*. The fuse segments 64*q* and 64*v* that are not connected to the dynamite stack 62*b* do not ignite.

The upper segment 64*j*, which is directly connected to the start segment 64*a*, has also burned out and has ignited three more segments 64*k*-*n* that are further connected. The segment 64*m* is shown being only partially burned out. However, because the fuse segments 64*j*-64*n* are not connected to any stacks of dynamite, no explosions have been triggered on this side of the fuse 64.

The upper segment 64*j* and the lower segment 64*b* burn generally simultaneously. Thus, even though the start segment 64*a* triggers a sequential chain of events, it is possible to have generally simultaneous explosions of dynamite. Alternatively, the upper segment 64*j* and the lower segment 64*b* burn alternatively, where the upper segment 64*j* burns first, completely, and only then does the lower segment 64 burn.

Figure 5:
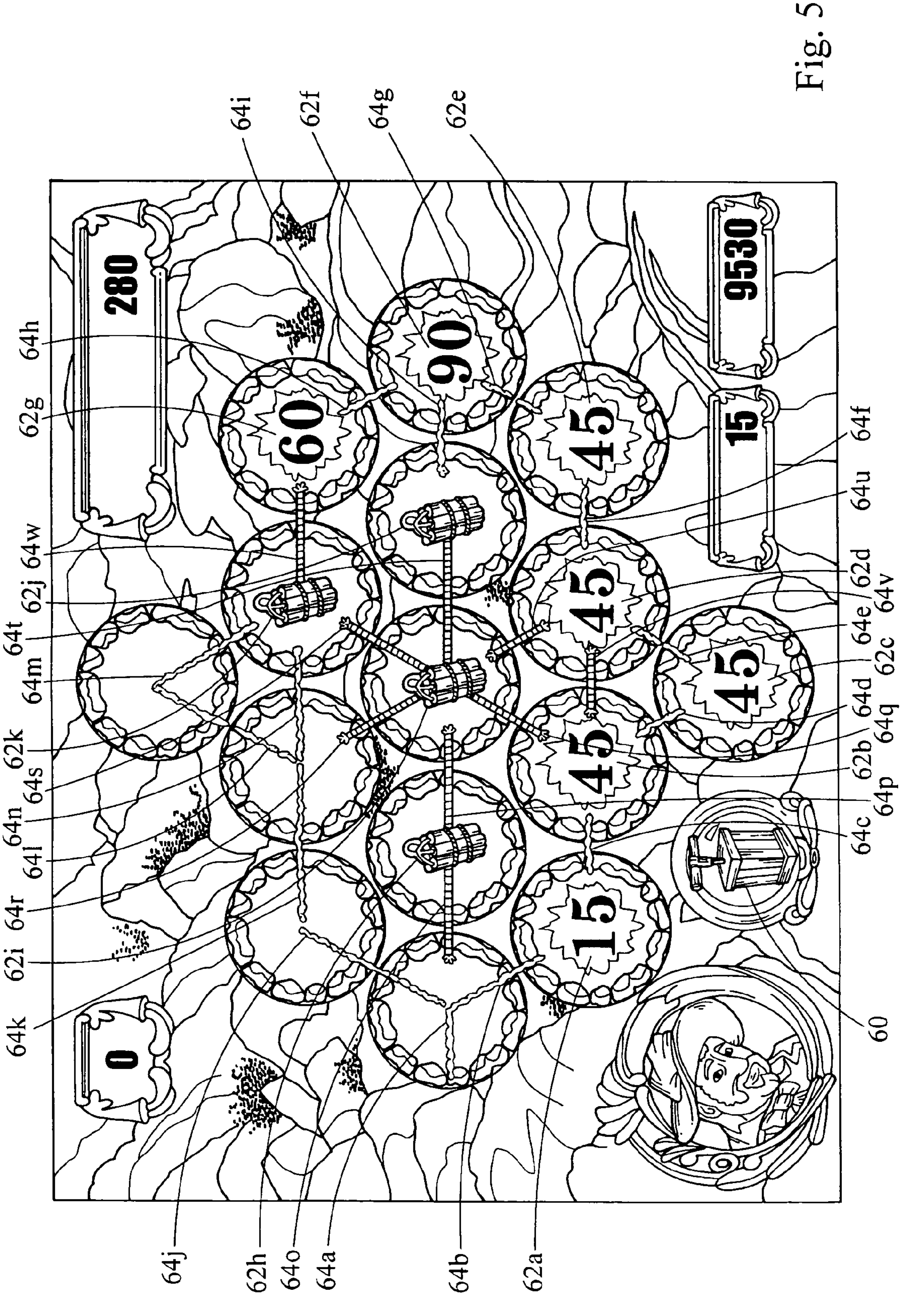
FIG. 5 is another illustration of the game screen of FIG. 3, showing in the exploded state all the dynamite stacks that were coupled to each other.

Referring to FIG. 5, the remaining dynamite stacks 62*d*-62*g* explode to reveal additional awards for the player, e.g., the dynamite stack 62*f* reveals an award of ninety credits.

Similarly, all the fuse segments 64*e*-64*i* have completely burned out. The dynamite stacks 62*h*-62*k* remain unexploded because there is no connection to the lit segments 64*a*-64*n*. Accordingly, any award that might be associated with the unexploded dynamite stacks 62*h*-62*k* remains hidden. Optionally, awards associated with unexploded dynamite stacks can be revealed to show the player what could have been won. Alternatively, in a subsequent bonus game the start segment can be randomly selected from a fuse segment that is connected to one of the unexploded dynamite stacks 62*h*-62*k*.

A plurality of spinning reels can be used, during a base game, to display a collection, or arrangement, of dynamite stacks 62 and fuse segments 64. For example, referring to FIG. 1, a plurality of reels can spin and stop to randomly form a collection of symbols including dynamite stacks and fuses. A symbol of the reels can include a dynamite stack and one or more fuses for connecting the dynamite stack to other dynamite stacks and/or fuses included in other symbols of the reels. Thus, different arrangements of dynamite stacks and fuses can be displayed for every spin of the reels. For example, in one embodiment a dynamite stack 62 symbol is associated with an award, while a fuse segment 64 symbol is not associated with an award. The fuse segment 64 symbols are used to connect the dynamite stack 62 symbols.

Awards are provided if, for example, three connected dynamite stacks are aligned along an active payline. Optionally, an award is provided if a scatter pay occurs. For example, an award is provided for any dynamite stacks that are connected even if the dynamite stacks are not connected along an active payline.

Alternatively, an arrangement of dynamite stacks and fuse segments can be displayed during a bonus game, which is optionally awarded if a triggering event occurs during a base game of the wagering game. For example, the dynamite stacks 62 and the fuse segments 64 can be randomly applied to a symbol arrangement such as the arrangement shown in FIGS. 3-5. As described above, a player wins an award associated with one or more of corresponding dynamite stacks 62, e.g., exploded dynamite stacks 62.

Other embodiments fall within the scope of the present invention. For example, the player can select any segment of the fuse 64 to be the start segment. Optionally, the controller 34 randomly selects which segment of the fuse 64 is the start segment. Alternatively, two or more segments are selected to each be a start segment.

Other themes can be used to practice the current invention. For example, an arrangement can include dominos and balloons. After a starting domino falls, all the connecting dominos begin to fall in sequence, causing any connecting balloon to burst and reveal a hidden award. In another example, an arrangement includes pipes with liquid that flows into connected pools, having floating boats for credit awards. Alternatively, the pools are initially full with liquid that drains, over time, to uncover hidden awards.

In another embodiment, an extra spin is awarded during a first spin. After all the appropriate credits are awarded during the first spin, the player can use the awarded extra spin as a second spin to receive an entirely new arrangement of dynamite stacks and fuses. An additional extra spin can be awarded during the second spin. Additional extra spins can be further awarded as the player continues to play the game.

In an alternative embodiment, at least one of the dynamite stacks can explode and light at least one disconnected fuse. This can occur, for example, randomly to give the player additional hope of continuing playing even after the game appears to be over.

In yet another alternative embodiment, the player may be awarded a multi-part award, which requires the explosion of a predetermined number of dynamite stacks. For example, a multi-part award requires the explosion of three pieces of gold dynamite. If the three pieces of gold dynamite explode, the player receives a large credit amount. If only one or two of the three pieces of gold dynamite explode, then the player does not receive a credit amount.

Each of these embodiments and obvious variations thereof is contemplated as falling within the spirit and scope of the claimed invention, which is set forth in the following claims.

What is claimed is:

1. A gaming system for playing a wagering game, comprising:

a wager input device for receiving a wager input from a player for playing said wagering game;

a display for displaying an arrangement of symbols including & plurality of primary symbols and a plurality of connector symbols, at least some of said plurality of primary symbols being separated from each other, at least two of said plurality of primary symbols being connected with one of said plurality of connector symbols, at least some of said plurality of primary symbols being associated with a corresponding award of a plurality of awards; and a controller coupled to said display and said wager input device, said controller programmed to cause a sequential chain display of at least two outcomes on said display in response to a single activation of said plurality of primary symbols, said sequential display of outcomes being initiated with a first one of said plurality of primary symbols and including all other symbols of said plurality of primary symbols that are connected to said first one of said plurality of primary symbols via at least one of said connector symbols, and provide the player with a payout relating to said awards of said plurality of primary symbols that are a part of said sequential display of outcomes.

2. The gaming system of claim 1, wherein said wagering game is selected from a group consisting of a base game and a bonus game.

3. The gaming system of claim 1, wherein said display includes a plurality of symbol-bearing slot reels that are rotated and stopped to display symbols associated with said arrangement of symbols.

4. The gaming system of claim 1, further comprising a selection button for selecting said first one of said plurality of primary symbols.

5. The gaming system of claim 1, wherein said controller is further programmed to select said first one of said plurality of primary symbols.

6. The gaming system of claim 1, wherein said controller is further programmed to reveal said awards during said sequential display of outcomes, said awards being initially hidden from the player.

7. The gaming system of claim 1, wherein said plurality of primary symbols are stacks of dynamite and said plurality of connector symbols are a plurality of fuses.

8. A method of conducting a wagering game on a gaming machine, the method comprising:

receiving a wager input from a player for playing said wagering game;

forming an arrangement of symbols including a plurality of primary symbols and a plurality of connector symbols, said arrangement of symbols having said plurality of primary symbols located separate from each other, at least two of said plurality of primary symbols being randomly connected with one of said plurality of connector symbols, at least two of said plurality of primary symbols not being connected with one of said plurality of connector symbols;

in response to a single activation of said plurality of primary symbols, triggering a sequential chain display of at least two outcomes involving all of said plurality of primary symbols that are interconnected via said connector symbols; and awarding a payout that relates to said all of said plurality of primary symbols involved in said sequential display.

9. The method of claim 8, wherein said displaying further includes rotating and stopping a plurality of symbol-bearing slot reels to display symbols associated with said arrangement of symbols.

10. The method of claim 8, wherein said triggering is caused by the player selecting a first one of said connector symbols.

11. The method of claim 8, wherein said triggering is caused by a controller of said gaming machine.

12. The method of claim 8, further comprising randomly selecting said arrangement of symbols via a controller of said gaming machine.

13. The method of claim 8, further comprising revealing said payout during said sequential display of outcomes, said payout being initially hidden from the player.

14. The method of claim 8, further comprising accepting from the player a location choice for a first one of said connector symbols.

15. The method of claim 8, further comprising displaying only a portion of said arrangement of symbols before said triggering step.

16. The method of claim 8, further comprising providing a plurality of triggering symbols, each of said triggering symbols being a connector symbol of said plurality of connector symbols.

17. The method of claim 16, wherein at least one of said triggering symbols is selected by a controller of said gaming machine and at least another one of said triggering symbols is selected by the player.

18. A computer readable storage medium encoded with instructions for directing a gaming device to perform the method of claim 8.

19. A method of conducting a wagering game on a gaming terminal, the method comprising:

receiving a wager input from a player;

displaying a randomly selected arrangement of connectors and hidden symbols;

forming at least one continuous path such that at least one of said connectors is connected to at least two of said hidden symbols, said continuous path including a start element;

in response to a single activation of said start element, triggering a chain of at least two outcomes associated with all of said hidden symbols that are coupled to said start element along said continuous path; and awarding an award for at least one of said outcomes.

20. The method of claim 19, wherein said chain of outcomes is sequential.

21. The method of claim 19, wherein said start element is one of said connectors.

22. The method of claim 19, wherein said arrangement of connectors and hidden symbols is awarded as a bonus game during a triggering event of a base game.

23. The method of claim 19, wherein said award is a multi-part award, said multi-part award being awarded if a predetermined number of said outcomes have been triggered.

24. The method of claim 19, wherein said award is an extra spin awarded in a slots base game.

* * * * *

UNITED STATES PATENT AND TRADEMARK OFFICE

CERTIFICATE OF CORRECTION

PATENT NO. : 7,431,645 B2
APPLICATION NO. : 11/111315
DATED : October 7, 2008
INVENTOR(S) : Peng Han et al.

It is certified that error appears in the above-identified patent and that said Letters Patent is hereby corrected as shown below:

In Column 8, Claim 1, please replace Lines 17-18 with the following:

-- a display for displaying an arrangement of symbols including a plurality of primary symbols and a plurality of --

Signed and Sealed this

Thirtieth Day of December, 2008

JON W. DUDAS
*Director of the United States Patent and Trademark Office*